O. A. WEISSENBORN.
MEANS FOR IDENTIFYING MOTOR OR OTHER VEHICLES IN CASE OF ACCIDENT.
APPLICATION FILED MAR. 18, 1912.

1,037,092.  
Patented Aug. 27, 1912.

Witnesses:  
Hugo A. Weissenborn  
G. M. Towey

Inventor:  
Oscar A. Weissenborn  
By his Attorney,  
David W. Gardner

UNITED STATES PATENT OFFICE.

OSCAR A. WEISSENBORN, OF JERSEY CITY, NEW JERSEY.

MEANS FOR IDENTIFYING MOTOR OR OTHER VEHICLES IN CASE OF ACCIDENT.

1,037,092.  Specification of Letters Patent.  Patented Aug. 27, 1912.

Application filed March 18, 1912. Serial No. 684,486.

*To all whom it may concern:*

Be it known that I, OSCAR A. WEISSENBORN, a citizen of the United States, residing in Jersey City, Hudson county, and State of New Jersey, have invented certain new and useful Improvements in Means for Identifying Motor or other Vehicles in Case of Accident, of which the following is a specification.

My invention relates to means whereby a motor or other vehicle may be readily identified in case of "running down", injuring or even killing a person, and then escaping before the parties responsible for such deed can be apprehended, and the invention consists broadly in mounting a plurality of identification checks on a breakable support between suitable brackets in front of the motor vehicle, whereby the breaking of the support will release a plurality of the identification checks.

Another feature of my invention consists in means for positively releasing said identification checks when the support is broken; still another feature consists in providing means for severing the support upon contact with any object such as a human being.

The invention also consists of other special features of construction hereinafter claimed specifically.

Figure 1:
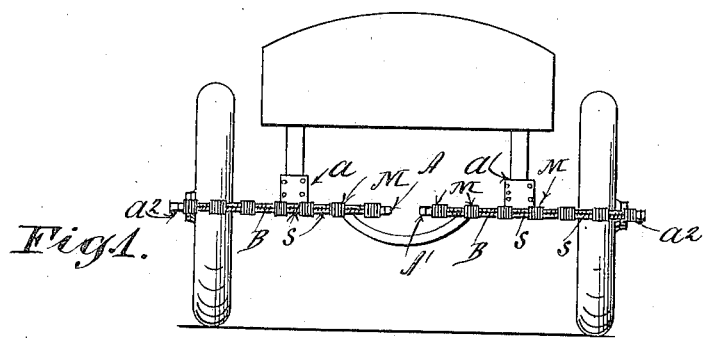
Figure 2:
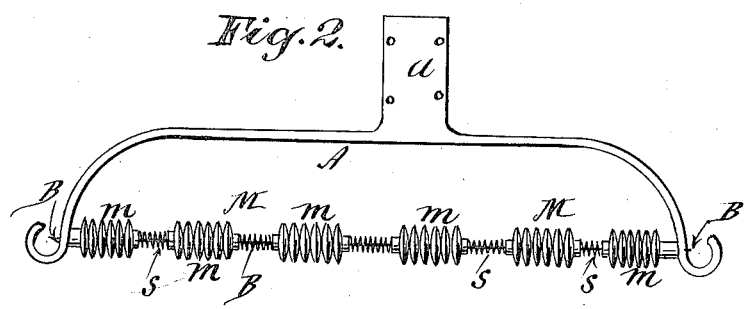
Figure 3:
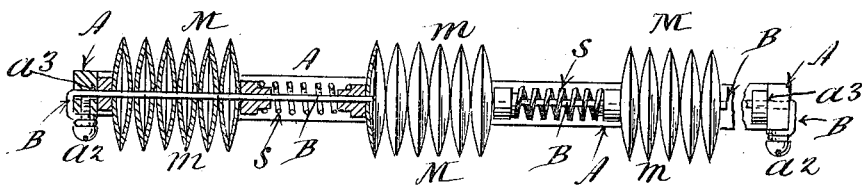
Figure 4:

In the accompanying drawings, Figure 1, is a front elevation of parts of a motor vehicle to which my improved device is attached; Fig. 2, a plan upon an enlarged scale of a fender constructed according to my invention; Fig. 3, is a sectional elevation of the fender, the central portion being broken away; Fig. 4, is a modification of a breakable support.

I have demonstrated by actual experiment that a wire of suitable thickness is best adapted for use as a support for mounting the identification checks upon, although I do not wish to confine myself thereto.

As shown in the drawings A, A', are brackets or supports attached to any stationary part of the motor vehicle by means of clamps $a$, $a'$. A wire or other suitable support B, is attached to the brackets A, A'. As shown in the drawings by way of illustration this support B is held in place on the brackets A, A, by set screws $a^2$. Upon the support B are mounted a plurality of identification checks, consisting in the present case of metal disks $m$, upon which may be stamped or otherwise placed the number of the motor vehicle.

To insure the release of the identification checks, upon the breaking of the support B, I provide springs $s$, which are placed at suitable intervals between the identification checks, and which tend constantly to thrust the disks $m$, apart.

By reference to Fig. 3, of the drawings it will be seen that I provide a cutting edge $a^3$, in the brackets A, A', to insure the positive breaking of the support B, when the latter comes in contact with any object, although this is not absolutely essential as the support will break under ordinary conditions. It will thus be seen that my device provides a fender which is neat in appearance and cheap of construction.

What I claim as my invention and desire to secure by Letters Patent is,

1. In a device for divulging the identity of a motor vehicle, a supporting bracket suitably secured to the front of a motor vehicle, a fender comprising a plurality of identification checks horizontally mounted on said brackets as and for the purpose described.

2. In a device for divulging the identity of a motor vehicle, a fender comprising a bracket suitably secured on the front of a motor vehicle, a breakable support carried by said bracket, and a plurality of identification checks on said support, substantially as and for the purpose described.

3. In a device for divulging the identity of a vehicle, a bracket suitably secured on the front of a vehicle, a breakable identification support carried by said bracket, a plurality of identification checks on said support, and means for positively releasing said identification checks on the breaking of said check support, as and for the purpose described.

OSCAR A. WEISSENBORN.

Witnesses:
 D. W. GARDNER,
 G. S. GARDNER.